United States Patent [19]
Liu

[11] Patent Number: 5,995,034
[45] Date of Patent: Nov. 30, 1999

[54] COMPUTER JOYSTICK WITH A REMOVABLE JOYSTICK HANDLE

[75] Inventor: Shu-Ming Liu, Taipei, Taiwan

[73] Assignee: Primax Electronics Ltd., Taipei, Taiwan

[21] Appl. No.: 08/974,071

[22] Filed: Nov. 19, 1997

[51] Int. Cl.⁶ ........................................................ G09G 5/08
[52] U.S. Cl. ............................................. 341/161; 463/38
[58] Field of Search .................................... 345/161, 156, 345/157, 163, 167, 169; 463/38; D14/117.5

[56] References Cited

U.S. PATENT DOCUMENTS

| | | | |
|---|---|---|---|
| 4,769,517 | 9/1988 | Swinney | 200/6 A |
| 5,532,529 | 7/1996 | Codina et al. | 307/129 |
| 5,607,158 | 3/1997 | Chan | 273/148 B |
| 5,691,898 | 11/1997 | Rosenberg et al. | 364/190 |

*Primary Examiner*—Amare Mengistu

[57] ABSTRACT

The present invention discloses a computer joystick having a removable joystick handle so that users can select a favorite joystick handle when using the computer joystick. The computer joystick comprises a chassis, a joystick mechanism having two shafts and a control handle rotatably installed in the opening of the chassis for interacting with the two shafts, two sensors installed in the chassis for detecting rotations of the two shafts separately and generating corresponding rotation signals, a joystick handle having a locking means installed on its bottom end for removably mounting the joystick handle to the top end of the control handle, and a control circuit wired to the two sensors for receiving rotation signals generated by the two sensors. The joystick handle further comprises at least one control button and an electrical wire having a first end connected to the button and a second end connected with an electric plug. And the control circuit further comprises a socket for removably connecting the plug of the joystick handle so that control signals generated by the button can be received by the control circuit.

2 Claims, 2 Drawing Sheets

COMPUTER JOYSTICK WITH A REMOVABLE JOYSTICK HANDLE

BACKGROUND OF THE INVENTION

1. Field of the Invention

The present invention relates to a computer joystick, and more particularly, to a computer joystick with a removable joystick handle.

2. Description of the Prior Art

Computer joysticks are quite popular for playing computer or video games, and the joystick handle of a computer joystick is the most important human interface when playing a game. Because every computer or video game has its own unique environment, different joystick handles may be needed to play different games.

The joystick handles of traditional computer joysticks are always fixed to their chassis which can not be removed and replaced by a user. If the user needs a different joystick handle, he or she has to buy another computer joystick which is quite expensive.

SUMMARY OF THE INVENTION

It is therefore a primary objective of the present invention to provide a computer joystick which has a removable joystick handle. A user can easily replace the joystick handle with a different one so that the above mentioned problem will never occur for the same reason.

In a preferred embodiment, the present invention comprises a computer joystick comprising:

a chassis having an opening on its top;

a joystick mechanism having two shafts perpendicular to each other and rotatably installed in the chassis, and a control handle rotatably installed in the opening of the chassis for interacting with the two shafts so that movements of the control handle can be converted into corresponding rotations of the two shafts;

two sensors installed in the chassis for detecting rotations of the two shafts separately and generating corresponding rotation signals;

a joystick handle having a locking means installed on its bottom end for removably mounting the joystick handle to a top end of the control handle so that the joystick handle coupled with the control handle can be used to drive the two shafts of the joystick mechanism, the joystick handle further comprising at least one control button and an electrical wire having a first end connected to the button and a second end connected with an electric plug; and a control circuit wired to the two sensors for receiving rotation signals generated by the two sensors, the control circuit further comprising a socket for removably connecting the plug of the joystick handle so that control signals generated by the button can be received by the control circuit.

It is an advantage of the present invention that the joystick handle can be replaced by unplugging the joystick handle and its plug from the chassis so that a different joystick handle can be mounted to the computer joystick.

This and other objectives and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
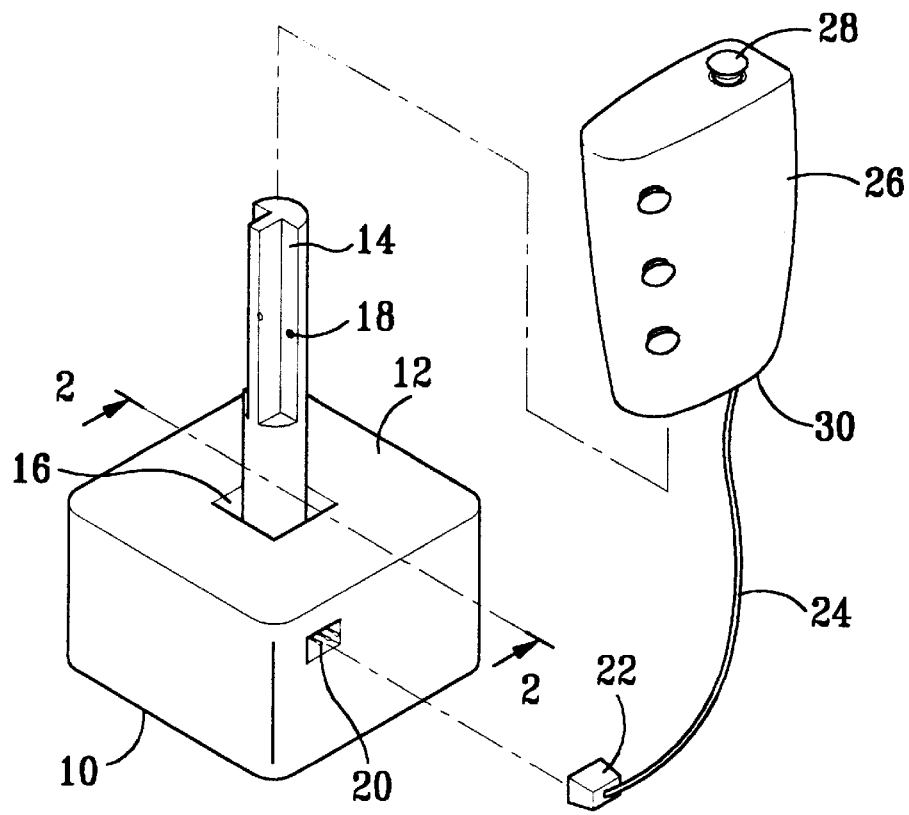
FIG. 1 is a perspective view of a computer joystick according to the present invention.

Please refer to FIG. 1. FIG. 1 is a perspective view of a computer joystick 10 according to the present invention. The joystick 10 comprises a chassis 12 for mounting electronic and mechanical parts in it, and a joystick handle 26. The chassis 12 comprises an electrical socket 20, a top opening 16, and a control handle 14 rotatably installed at the opening 16 of the chassis 12. The joystick handle 26 can be mounted to the top end of the control handle 14 so that a user can use the joystick handle 26 coupled with the control handle 14 to interact with a computer or video game. The joystick handle 26 comprises four electrical buttons 28 installed on it, and a wire 24 connected to the four buttons 28. Another end of the wire 24 comprises a plug 22 for plugging to the socket 20 of the chassis 12.

Figure 2:
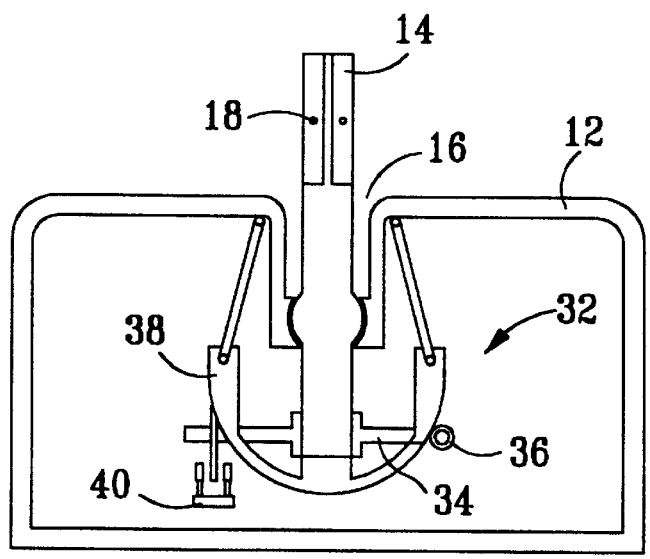
FIG. 2 is a sectional view along line 2—2 of the computer joystick shown in FIG. 1.

Please refer to FIG. 2. FIG. 2 is a sectional view along line 2—2 of the joystick 10 shown in FIG. 1. It shows the internal structure of the joystick 10. The joystick 10 comprises a joystick mechanism 32 installed inside the chassis 12 and two sensors 40. The joystick mechanism 32 comprises two shafts 34 and 36 perpendicular to each other and rotatably installed in the chassis 12, a control handle 14 rotatably installed in the opening 16 of the chassis 12 having a hemisphere-shaped ball 38 installed on its bottom end for interacting with the two shafts 34 and 36 so that movements of the control handle 14 can be converted into corresponding rotations of the two shafts 34 and 36. The two shafts 34 and 36 are used for measuring movements of the control handle 14 along two perpendicular directions. Two sensors 40 are separately installed in the chassis 12 (only one sensor is shown) for detecting rotations of the two shafts 34 and 36 separately and generating corresponding rotation signals.

Figure 3:
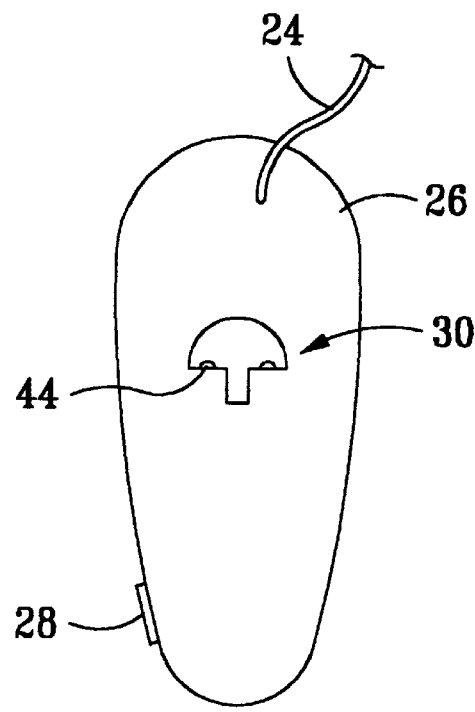
FIG. 3 is a bottom view of the joystick handle shown in FIG. 1.

Please refer to FIG. 3. FIG. 3 is a bottom vies of the joystick handle 26 shown in FIG. 1. The joystick handle 26 comprises a specifically shaped recess 30 at its bottom end which is used as a locking means for matching and removably mounting the joystick handle 26 to the top end of the control handle 14 shown in FIG. 1 so that the joystick handle 26 coupled with the control handle 14 can be used to drive the two shafts 34 and 36 of the joystick mechanism 32.

The joystick handle 26 further comprises two rollers 44 installed in it which are used as an elastic detention means, and the control handle 14 further comprises two corresponding holes 18 at its top end which are used as a receiving means for receiving the detention means 44 of the joystick handle 26. The elastic detention means 44 of the joystick handle 26 is engaged with the receiving means 18 of the control handle 14 to reliably hold the joystick handle 26 on top of the control handle 14 when the joystick handle 26 is mounted to the control handle 14. Other methods can also be used to mount the joystick handle 26 to the control handle 14. For example, threads can be made inside the recess 30 and also on the top end of the control handle 14 so that the joystick handle 26 can be rotatably mounted to the top end of the control handle 14.

Figure 4:
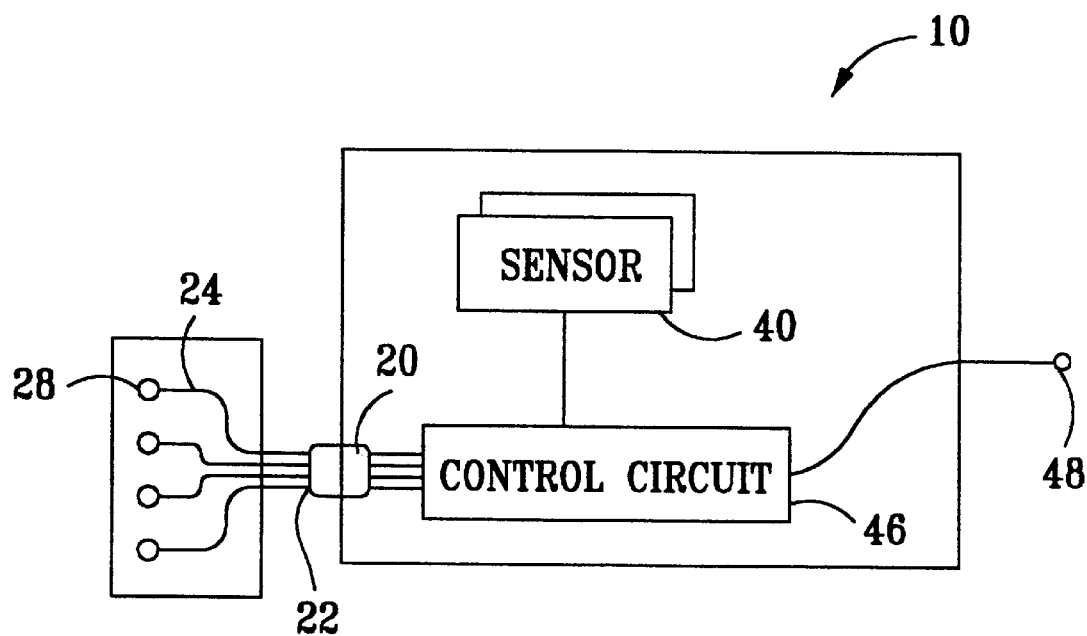
FIG. 4 is a function block diagram of the computer joystick shown in FIG. 1.

Please refer to FIG. 4. FIG. 4 is the function block diagram of the joystick 10 shown in FIG. 1. The joystick 10 comprises a joystick handle 26 having four buttons 28 installed in it and a wire 24 connected to the four buttons 28, two sensors 40 for detecting rotations of the two shafts 34 and 36 shown in FIG. 2 and generating corresponding rotation signals, and a control circuit 46 wired to the two sensors 40 and the four buttons 28 through the wire 24, the plug 22 and the socket 20. The control circuit 96 is used for generating output signals over a port 48 according to the rotation signals received from the two sensors and the control signals received from the four buttons 28.

The joystick 10 of the present invention uses the recess 30 and the elastic detention means 44 to removably fasten the joystick handle 26 to the control handle 14 and the plug 22 to removably connect the four buttons 28 to the control circuit 46. A user can easily replace the joystick handle 26, not the joystick 10, with another joystick handle to play a different game which is quite convenient and also economical to the user.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A computer joystick comprising:

a chassis having an opening on its top;

a joystick mechanism having two shafts perpendicular to each other and rotatably installed in the chassis, and a control handle rotatably installed in the opening of the chassis for interacting with the two shafts so that movements of the control handle can be converted into corresponding rotations of the two shafts;

two sensors installed in the chassis for detecting rotations of the two shafts separately and generating corresponding rotation signals;

a joystick handle having a locking means installed on its bottom end for removably mounting the joystick handle to a top end of the control handle so that the joystick handle coupled with the control handle can be used to drive the two shafts of the joystick mechanism, the locking means of the joystick handle comprising a specifically shaped recess for matching and removably mounting the top end of the control handle, the joystick handle further comprising at least one control button, an electrical wire having a first end connected to the button and a second end connected with an electric plug, and an elastic detention means installed inside the recess, and the control handle comprising a corresponding receiving means at its top end for receiving the detention means wherein the elastic detention means of the joystick handle is engaged with the receiving means of the control handle to reliably hold the joystick handle on top of the control handle when the joystick handle is mounted to the control handle; and a control circuit wired to the two sensors for receiving rotation signals generated by the two sensors, the control circuit further comprising a socket for removably connecting the plug of the joystick handle so that control signals generated by the button can be received by the control circuit.

2. The joystick of claim 1 wherein the socket of the control circuit is installed on the chassis for connecting the plug of the joystick handle.

* * * * *